United States Patent [19]

Killian et al.

[11] Patent Number: 4,692,079
[45] Date of Patent: Sep. 8, 1987

[54] BOWED INTERNAL SPRING RETAINING RING THAT FUNCTIONS REGARDLESS OF ITS ORIENTATION WHEN INSTALLED IN A GROOVE

[75] Inventors: Edmund F. Killian, Merrick; Wallace H. Berliner, Woodside, both of N.Y.

[73] Assignee: Waldes Truarc Inc., Long Island City, N.Y.

[21] Appl. No.: 650,703

[22] Filed: Sep. 14, 1984

[51] Int. Cl.⁴ ............................................. F16B 21/18
[52] U.S. Cl. .................................. 411/353; 411/517
[58] Field of Search ............... 411/353, 517, 518, 519

[56] References Cited

U.S. PATENT DOCUMENTS

| Re. 18,144 | 8/1931 | Heiermann ..................... 411/353 X |
| 2,487,802 | 11/1949 | Heimann . |
| 2,524,273 | 10/1950 | Saler .............................. 411/517 X |
| 2,544,631 | 3/1951 | Heimann et al. . |
| 2,800,800 | 7/1957 | Dunn .............................. 411/519 X |
| 2,950,132 | 8/1960 | Kocsuta . |
| 3,104,905 | 9/1963 | Erdmann et al. ............... 411/517 X |
| 3,173,266 | 3/1965 | Shutt . |
| 3,233,497 | 2/1966 | McCormick . |
| 3,438,664 | 4/1969 | Meyer . |
| 3,483,789 | 12/1969 | Wurzel ............................... 411/517 |
| 3,884,589 | 5/1975 | Liedholm ...................... 411/517 X |
| 4,256,010 | 3/1981 | Petrie ................................ 411/518 |

FOREIGN PATENT DOCUMENTS

| 2427006 | 12/1974 | Fed. Rep. of Germany ...... 411/517 |
| 2504891 | 12/1976 | Fed. Rep. of Germany ...... 411/517 |
| 785957 | 5/1935 | France ............................. 411/518 |
| 873995 | 4/1942 | France ............................. 411/518 |
| 660746 | 11/1951 | United Kingdom . |
| 702932 | 1/1954 | United Kingdom ............... 411/518 |
| 1441467 | 6/1976 | United Kingdom ............... 411/518 |

Primary Examiner—Gary L. Smith
Assistant Examiner—Rodney M. Lindsey
Attorney, Agent, or Firm—Eugene E. Renz, Jr.

[57] ABSTRACT

A bowed internal retaining ring comprises a middle tab and a pair of intermediate tabs projecting generally radially from the ring, said middle tab being flat and coplanar with a pair of flat end sections of the ring. The ring can be installed forwardly or backwardly without appreciably altering the performance of the ring.

4 Claims, 6 Drawing Figures

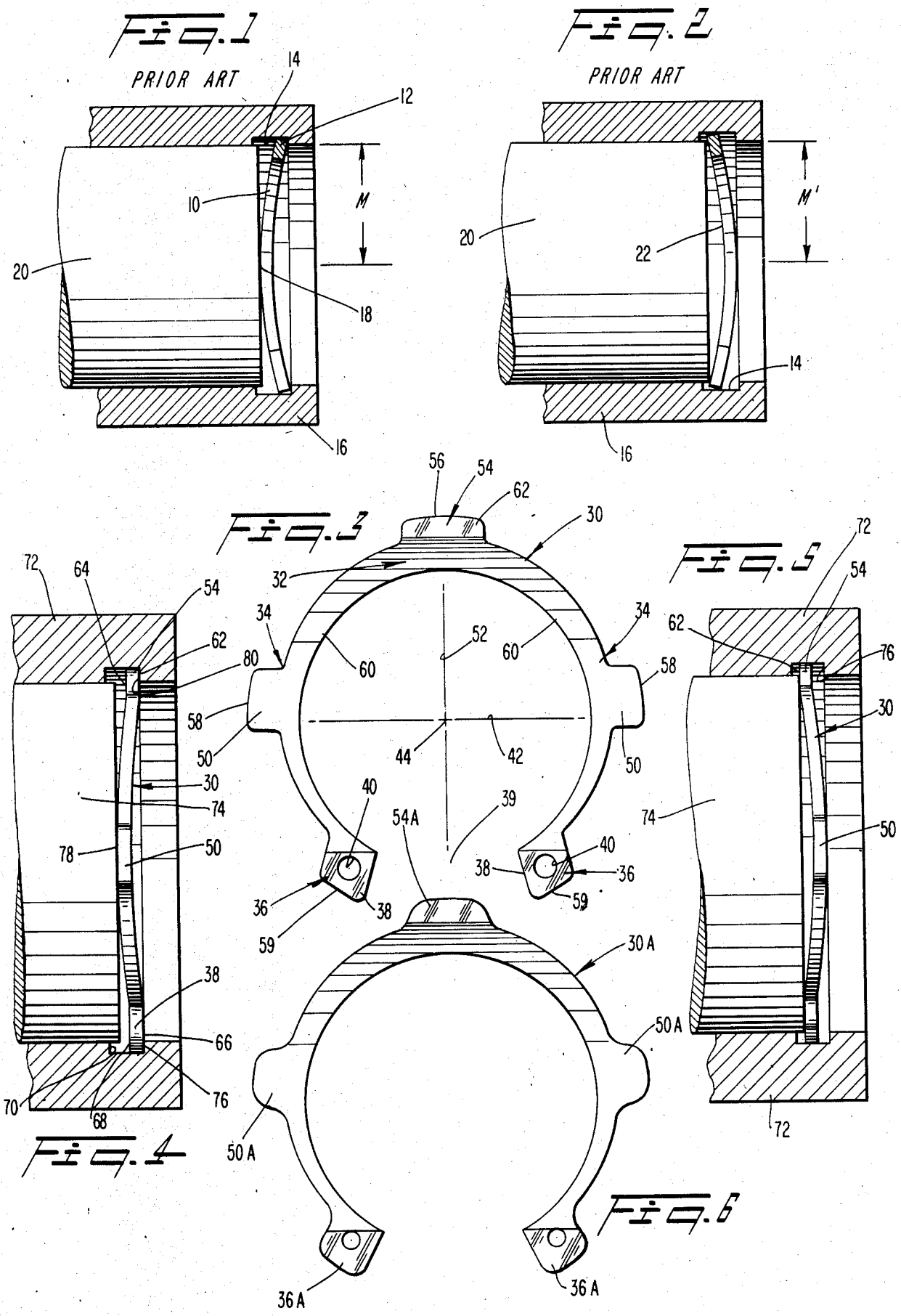

BOWED INTERNAL SPRING RETAINING RING THAT FUNCTIONS REGARDLESS OF ITS ORIENTATION WHEN INSTALLED IN A GROOVE

BACKGROUND AND OBJECTS OF THE INVENTION

The present invention relates to a spring retaining ring of the bowed, internal type.

Machines, tools and numerous other types of structures and equipment often include movable components which are to be secured in place. To achieve this goal, use is sometimes made of spring retaining rings which are mounted on one component to form an artificial shoulder lying in the path of the other component, i.e., the retained part. Retaining rings are of various types, including a so-called "bowed" ring which is of non-planar (non-flat) profile (e.g., see U.S. Pat. No. 2,487,802). A bowed ring is yieldable resiliently in an axial direction and thus is highly suited to take-up end play caused by component wear, or tolerances in groove location, or tolerances in dimensions of the components. Bowed rings also dampen vibrations and oscillations of the retained parts. While achieving those advantages, bowed rings maintain a tight grip radially against the bottom of the groove.

Bowed retaining rings can be of the "internal" or "external" type. As can be seen from FIG. 1, an internal bowed ring 10 is specifically configured and dimensioned so that its radially outer portion 12 fits into a circular internal groove 14 of one component 16 and its radially inner portion 18 lies in the path of the retained part 20 to be capable of making contact with the latter. Thus, an internal bowed ring is intended to engage the retained part with its convex side.

An external ring is specifically configured and dimensioned so that its radially inner portion fits into a circular external groove of one component and its radially outer portion lies in the path of the retained part. Thus, an external bowed ring engages the retained part with its concave side.

To insure proper functioning of a bowed retaining ring, it is important that the ring be correctly installed. In the case of a bowed internal ring, this has heretofore required that the ring be installed such that the bowed portion of the ring projects toward the retained part, i.e., that the convex side of the ring engage the retained part as noted above. However, it may occur that a bowed internal ring is installed backwards, e.g., during insertion by careless or untrained personnel. In such an event, the concave side 22 of the ring will face the retained part 20, as depicted in FIG. 2. This results in the behavior characteristics of the ring being altered, because the length of the effective moment arm of the force applied against the ring is changed. In that regard, attention is directed to FIG. 1 which depicts a side view of the moment arm M which extends from the outer edge of the ring to the place of contact of the ring with the retained part (the outer edge defining the fulcrum about which the bowed portion flexes). In FIG. 2, however, the bowed portion defines the fulcrum and the retained part engages the ring at a location spaced inwardly of the outer edge of the ring. Hence, the resulting moment arm M' omits that portion of the ring disposed within the groove 14, and the consequent performance of the ring may be substandard. In situations where the risk of such a substandard performance cannot be tolerated, bowed-type retaining rings have, for the above reasons, not been employed. As a result, advantage cannot be taken of the earlier noted advantages emanating from the use of bowed retaining rings, e.g., end play take-up vibration reduction, etc.

It is, therefore, an object of the present invention to minimize or obviate problems of the above-described type.

Another object is to provide a bowed internal spring retaining ring which functions acceptably regardless of its installed orientation.

SUMMARY OF THE INVENTION

These objects are achieved by the present invention which relates to a bowed internal spring retaining ring formed of a spring material. The ring comprises a middle section, a pair of spaced apart end sections, and a pair of intermediate sections interconnecting the middle section and the end section. The ring is symmetrically bowed about an imaginary transverse line disposed between the middle section and the end sections. The middle section includes a flat portion, and the end sections are flat and coplanar with each other and with the flat portion of the middle section.

Preferably, the intermediate sections each include a generally radially outwardly projecting intermediate tab, and the middle section includes a generally radially outwardly projecting middle tab. The flat portion of the middle section being defined by the middle tab.

THE DRAWINGS

The objects and advantages of the invention will become apparent from the following detailed description of preferred embodiment thereof, in connection with the accompanying drawings, in which like numerals designate like elements, and in which:

FIG. 1 is a longitudinal sectional view taken through a piece of equipment including a prior art bowed internal spring retaining ring which is installed in a forward condition;

FIG. 2 is a view similar to FIG. 1 wherein the prior art retaining ring is installed in a backwards condition;

FIG 3 is a front view of a bowed internal spring retaining ring according to the present invention;

FIG. 4 is a view similar to FIG. 1 depicting the retaining ring of the present invention installed in a forwards condition;.

FIG. 5 is a view similar to FIG. 4 wherein the retaining ring of the present invention is installed in a backwards condition; and FIG. 6 is a view similar to FIG. 3 of a modified version of the retaining ring according to the present invention.

DETAILED DESCRIPTION OF PREFERRED EMBODIMENTS OF THE INVENTION

A bowed internal spring retaining ring 30 in accordance with the present invention is depicted in FIG. 3. The ring 30 comprises an open-ended spring steel ring which includes a middle section 32, a pair of end sections 36, and a pair of intermediate sections 34 which interconnect the end sections 36 with the middle section 32. The end sections 36 each include lugs or ears 38 which are apertured at 40 for the reception of the points of a conventional handling tool. The ears 38 are spaced apart to define an opening 39 located opposite the middle section 32.

The ring 30 is symmetrically bowed about an imaginary transverse line 42 which extends transversely of the ring's longitudinal axis 44 and is situated between the middle section 32 and the opening 39. Preferably, the ring is bowed to conform to the outer periphery of an imaginary cylinder of a fixed radius as explained in more detail in the afore-mentioned U.S. Pat. No. 2,487,802, the disclosure of which is incorporated herein by reference.

The intermediate sections 34 each include a radially outwardly projecting intermediate tab 50, the tabs 50 being generally aligned with one another on opposite sides of the longitudinal axis 44 of the ring at locations generally midway along the respective intermediate portions. The imaginary line 42 passing through the longitudinal axis of the ring extends perpendicularly to an imaginary line 52 bisecting the opening 39 and intersects the lower portions of the intermediate tabs 50.

The middle section 32 includes a radially outwardly projecting middle tab 54 which is situated opposite the opening 39 of the ring and is bisected by the imaginary line 52. The outer edges 56, 58, 59 of the middle and intermediate tabs 50, 54 and end sections 36 lie substantially on a common radius, although the base portions 60 of the intermediate sections 34 progressively decrease in radial thickness as they approach the end sections.

The middle tab 54 is flat, and presents first and second surfaces 62, 64 each of which lies in a plane disposed perpendicularly relative to the longitudinal axis of the ring.

The end sections 38 are also flat and are coplanar with the middle tab 54, i.e., each end section 36 defines first and second surfaces 66, 68 which are coplanar with the first and second surfaces 62, 64, respectively, of the middle tab 54.

FIG. 4 depicts the ring 30 after it has been sprung in an intended manner, into an internal groove 70 of a component 72 in order to lie in the path of a retained part 74. For example, the ring 30 may be employed to retain the cross and bearing cups of an automobile universal joint assembly. The first surface 62 of the middle tab 54 engages a side wall 76 of the groove 70, while the convex side 78 of the bowed portion abuts the retained part 74.

Hence, in the event that the retained part 74 pushes against the ring, the ring will tend to flex about a fulcrum at a point 80 where the middle tab 54 abuts the edge of the groove. Accordingly, the resultant moment arm does not include that portion of the ring disposed within the groove itself, contrary to the prior art arrangement depicted in FIG. 1.

In the event that the ring 30 is installed backwardly into the groove as depicted in FIG. 5, the intermediate tabs 50 engage the side wall 76 of the groove and the first surface 62 of the middle tab 54 engages the retained part 74. In that regard, it will be appreciated that the radial dimension of the first surface 62 is longer than the groove depth so as to project radially inwardly beyond the groove to lie in the path of the retained part 74. The moment arm in such a case does not include that portion of the ring disposed within the groove 70, as in the case of the prior art arrangement depicted in FIG. 2. Hence, regardless of the installed orientation of the ring, the effective moment arm will not include that portion of the ring disposed within the retaining groove, whereby the behavior of the ring in both cases can be relatively similar. Note that in each case, the bowed portion of the ring is disposed entirely out of the groove, whereas in the prior art of FIGS. 1 and 2, some of the bowed portion is disposed within the groove thus giving rise to the potential problems noted above in the event that the ring is installed backwards.

A slightly modified ring 30A is depicted in FIG. 6 wherein the end sections 36A are less pronounced and have somewhat curved edges. The middle tab 54A and intermediate tabs 50A also present generally curved edges. The behavior of the ring 30A is similar to that described above in connection with FIG. 3.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. In combination, a first component having an internal annular groove, a bowed internal spring retaining ring disposed in said groove, and a second component retained by said ring, said ring being formed of a spring material and comprising a middle section, a pair of spaced apart end sections, and a pair of intermediate sections connecting said middle section with said end sections, said intermediate sections each including a generally radially outwardly projecting first tab, said middle section including a generally radially outwardly projecting second tab, said end sections each including a generally radially outwardly projecting third tab, said ring being symmetrically bowed about an imaginary transverse line disposed between said middle section and said end sections and passing through said intermediate sections, said second tab and said third tabs being flat and coplanar, said flat second tab and said flat third tabs being longer in the radial direction than the radial depth of said groove so as to project radially inwardly beyond said groove and into the path of said second component.

2. A ring according to claim 1, wherein said first, second and third tabs include outer edges lying substantially on a common radius.

3. A ring according to claim 1, wherein said intermediate sections include base portions which progressively decrease in radial thickness from said middle section toward said end sections.

4. A ring according to claim 1, wherein said imaginary transverse line extends perpendicularly to an imaginary line bisecting said middle tab.

* * * * *